United States Patent
Harrington et al.

(10) Patent No.: US 7,539,621 B2
(45) Date of Patent: May 26, 2009

(54) SYSTEMS AND METHODS OF DISTRIBUTING CENTRALLY RECEIVED LEADS

(75) Inventors: Gerard Harrington, Huntington Beach, CA (US); Greg Daniels, Algonquin, IL (US); Eugene Wada, Irvine, CA (US); Steve Center, Rolling Hills Estate, CA (US); Michael Keranen, Signal Hill, CA (US); Suresh Nair, Torrance, CA (US); Jim Dudley, Irvine, CA (US); John Fulcher, Newport Coast, CA (US); Melveen Fredeluces, Long Beach, CA (US); Dave Mateer, Torrance, CA (US); Roy Nakahira, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 888 days.

(21) Appl. No.: 10/872,648

(22) Filed: Jun. 21, 2004

(65) Prior Publication Data

US 2005/0044036 A1  Feb. 24, 2005

Related U.S. Application Data

(60) Provisional application No. 60/497,378, filed on Aug. 22, 2003, provisional application No. 60/547,356, filed on Feb. 23, 2004.

(51) Int. Cl.
  *G06Q 10/00* (2006.01)
(52) U.S. Cl. ............................................. 705/1; 705/14
(58) Field of Classification Search ...................... 705/1
  See application file for complete search history.

(56) References Cited

U.S. PATENT DOCUMENTS 5,883,940 A * 3/1999 Thornton .................... 379/88.2
5,899,978 A 5/1999 Irwin
5,930,764 A * 7/1999 Melchione et al. ............ 705/10
5,966,695 A 10/1999 Melchione et al.
6,041,310 A 3/2000 Green et al.
6,067,525 A 5/2000 Johnson et al.

(Continued)

OTHER PUBLICATIONS

Brennan, Tom. "Outsourcing for mid-sized business CRM success". Customer Inter@ction Solutions. Norwalk: Sep. 2001. vol. 20, Iss. 3; p. 46.*

(Continued)

*Primary Examiner*—John G Weiss
*Assistant Examiner*—Gabrielle McCormick
(74) *Attorney, Agent, or Firm*—McDermott Will & Emery LLP

(57) ABSTRACT

Methods and systems for managing and distributing centrally-received leads to a plurality of remote dealers are disclosed. The management and distribution of leads may be handled by the centralized methods and systems regardless of the type of lead management software each supported dealer may employ. Also disclosed are systems and methods for collecting and processing information relating to the effectiveness of a dealer's follow-through on leads that it receives, independent of how that dealer processes leads or what type of lead management software the dealer uses. Additional disclosures include systems and methods for transmitting leads and lead follow-up and effectiveness information between a central system that receives leads from a plurality of sources and a dealer via an intermediary.

42 Claims, 3 Drawing Sheets

U.S. PATENT DOCUMENTS

| | | |
|---|---|---|
| 6,076,064 A | 6/2000 | Rose, Jr. |
| 6,097,792 A | 8/2000 | Thornton |
| 6,282,517 B1 | 8/2001 | Wolfe et al. |
| 6,341,270 B1 | 1/2002 | Esposito et al. |
| 6,546,374 B1 | 4/2003 | Esposito et al. |
| 6,587,838 B1 | 7/2003 | Esposito et al. |
| 6,609,108 B1 | 8/2003 | Pulliam et al. |
| 6,636,790 B1 | 10/2003 | Lightner et al. |
| 2002/0024537 A1 | 2/2002 | Jones et al. |
| 2002/0065707 A1 | 5/2002 | Lancaster et al. |
| 2002/0103715 A1* | 8/2002 | Bennett et al. ............ 705/26 |
| 2002/0184269 A1 | 12/2002 | Imagou |
| 2003/0018655 A1* | 1/2003 | Arroyo et al. ............ 707/203 |
| 2003/0171975 A1 | 9/2003 | Kirshenbaum et al. |
| 2003/0191660 A1 | 10/2003 | Himes |

OTHER PUBLICATIONS

PR Newswire. "Microsoft Dealerpoint.Net Automotive Lead Management Service Completes Upgrade to 6,500 Dealers in One Month". PR Newswire. New York: Oct. 2, 2001.*

* cited by examiner

SYSTEMS AND METHODS OF DISTRIBUTING CENTRALLY RECEIVED LEADS

CROSS REFERENCE TO RELATED APPLICATION

This application is related to and claims the benefit of the filing date of U.S. provisional applications Ser. No. 60/497,378, filed Aug. 22, 2003, entitled "Lead Distribution and Routing Application," and Ser. No. 60/547,356, filed Feb. 23, 2004, entitled Lead Distribution and Routing System Lead Augmentation: Electronic Customer Relations and Management (ECRM), the contents of both of which are incorporated herein by reference.

BACKGROUND

1. Field

The disclosure herein relates generally to the management of sales leads. More specifically, the disclosure relates to methods of handling and distributing leads to multiple remote sales points, as well as tracking their results.

2. Description of Related Art

Many businesses involved in sales attempt to generate and utilize leads in order to create new business and increase sales. Leads can be generated in many different ways. For example, a customer of the business might refer a new customer, resulting in a lead for that new customer. Or, potential customer might request information from the company, resulting in a lead for that potential customer. Often, lists of people and associated demographic data are purchased from business that assemble and sell such lists, and the information is used to develop potential leads for would-be customers. As is well-understood in the business world, leads can manifest in a variety of different forms, and can be valuable tools for new business generation if used effectively.

Unfortunately, very large companies with multiple points of distribution and sales are faced with difficulties in harnessing and utilizing their leads. Although large expenditures of time and money are often incurred to generate and develop leads, effective use and implementation of the leads has proven to be a formidable task. For example, large automobile manufacturers or distributors typically sell their products through numerous independent dealerships that may be located all across an entire country. This requires application of the distributor's leads in many locations that are remote from the distributor itself, leaving the distributor with little, if any, control over how the leads are utilized, and making it difficult to track the success of lead follow-up efforts. The remote dealerships often rely on the distributor for advertising of the product and generation of leads. However, managing leads that are received by the distributor as a result of these advertising and lead generation efforts, funneling those leads to the numerous, remote independent dealerships, and tracking the follow-up efforts made for the leads, is a complicated process. There are many problems associated with attempting to centrally manage leads intended for distribution to remote locations.

First of all, because leads are generated in a variety of different ways and take numerous different forms, it can be difficult process multiple leads. The data formats of the leads may vary, and the type of information may also vary, from one lead source to the next. Supporting all possible types of incoming leads can be complicated and inefficient. Second, with an extremely large force of dealers and sales points, the process of identifying which dealers are best-suited to which incoming leads can also be complex. Moreover, asserting control over how the leads are handled by remote dealers may be difficult or nearly impossible for the centralized lead reception point. Even retaining feedback from dealers regarding the usefulness of leads they receive, and whether the leads resulted in ultimate sales, can be complicated and inefficient, because of the independence with which each dealer may be free to operate. Dealers of different sizes and varying geographic locations may have different business requirements, different operations, and different needs. Thus, various types of lead management software applications will appeal to different dealers. Accordingly, dealers routinely use various types of lead management software, often presenting a significant problem to companies who attempt to receive and process feedback from these different programs. Essentially, the distributor may need to stand ready to support data from every possible lead management software application available on the market. However, this task may be too formidable to be efficiently or effectively achieved using state of the art methods. The result may be that companies spend large amounts of time and money to develop and distribute leads to their product dealers, yet have an impaired ability to efficiently distribute these leads or to track the success of distributed leads.

SUMMARY

A method of distributing a plurality of incoming leads to a plurality of automotive dealers, wherein each dealer utilizes one of several different types of lead management software, may include receiving the leads and, for each lead, (1) identifying a dealer, from the plurality of dealers, to which the lead should be forwarded, (2) identifying a type of lead management software used by the identified dealer, (3) identifying an intermediary that is associated with the identified lead management software type, and (4) delivering the lead, together with information indicating the identified dealer, to the intermediary. Computer-readable media may embody a program of instructions executable by a computer to perform this method.

A method of tracking leads delivered to a plurality of automotive dealers from a central system that receives leads from a plurality of sources may include delivering the leads to the dealers from the central system, receiving information from each of the dealers regarding follow-up efforts that the dealer has made in connection with the leads delivered to the dealer from the central system, storing the received information in memory, and analyzing the stored information. Computer-readable media may embody a program of instructions executable by a computer to perform this method.

A method of transmitting an incoming lead to an automotive dealer, wherein the dealer utilizes lead management software, may include receiving the lead from a central system that receives leads from a plurality of sources, wherein the lead comprises data in a first format that is incompatible with the lead management software, converting the lead to a second data format that is compatible with the lead management software, and delivering the converted lead to the dealer. Computer-readable media may embody a program of instructions executable by a computer to perform this method.

A method of transmitting to a central system that receives leads from a plurality of sources information about follow-up efforts that a dealer has made in connection with a lead may include receiving the information from the dealer, wherein the information comprises data in a first format that is incompatible with software utilized by the central system, converting the information to a second data format that is compatible with the central system software, and delivering the converted information to the central system. Computer-readable media may embody a program of instructions executable by a computer to perform this method.

A system for distributing a plurality of incoming leads to a plurality of automotive dealers, wherein each dealer utilizing one of several different types of lead management software may include a data interface configured to receive the leads and a processor. For each lead, the processor may be configured to (1) identify a dealer, from the plurality of dealers, to which the lead should be forwarded, (2) identify a type of lead management software used by the identified dealer, (3) identify an intermediary that is associated with the identified lead management software type, and (4) cause the lead, together with information indicating the identified dealer, to be delivered to the intermediary.

A system for tracking leads delivered to a plurality of automotive dealers from a central system that receives leads from a plurality of sources may include a processor configured to cause the leads to be transmitted from the central system to the dealers, a data interface configured to receive information from each of the dealers regarding follow-up efforts that the dealer has made in connection with the leads delivered to the dealer from the central system, and memory configured to store the received information. The processor may be further configured to analyze the stored information.

A system for transmitting an incoming lead to an automotive dealer, wherein the dealer utilizes lead management software, may include a data interface configured to receive the lead from a central system that receives leads from a plurality of sources, wherein the lead comprises data in a first format that is incompatible with the lead management software, and a processor configured to convert the lead to a second data format that is compatible with the lead management software. The processor may be further configured to cause the converted lead to be delivered to the dealer.

A system for transmitting to a central system that receives leads from a plurality of sources information about follow-up efforts that a dealer has made in connection with a lead may include a data interface configured to receive the information from the dealer, wherein the information comprises data in a first format that is incompatible with software utilized by the central system, and a processor configured to convert the information to a second data format that is compatible with the central system software. The processor may be further configured to deliver the converted information to the central system.

It is understood that other embodiments of the present disclosures will become readily apparent to those skilled in the art from the following detailed description, wherein it is shown and described only exemplary embodiments by way of illustration. As will be realized, the invention is capable of other and different embodiments and its several details are capable of modification in various other respects, all without departing from the spirit and scope of the disclosures herein. Accordingly, the drawings and detailed description are to be regarded as illustrative in nature and not as restrictive.

BRIEF DESCRIPTION OF THE DRAWINGS

Aspects of the present disclosure are illustrated by way of example, and not by way of limitation, in the accompanying drawings, wherein.

DETAILED DESCRIPTION OF ILLUSTRATIVE EMBODIMENTS

The detailed description set forth below in connection with the appended drawings is intended as a description of exemplary embodiments and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the disclosures herein. However, it will be apparent to those skilled in the art that the teachings of the present disclosure may be practiced without these specific details. In some instances, well-known structures and devices are shown in block diagram form in order to avoid obscuring the concepts of the disclosures herein.

Figure 1:
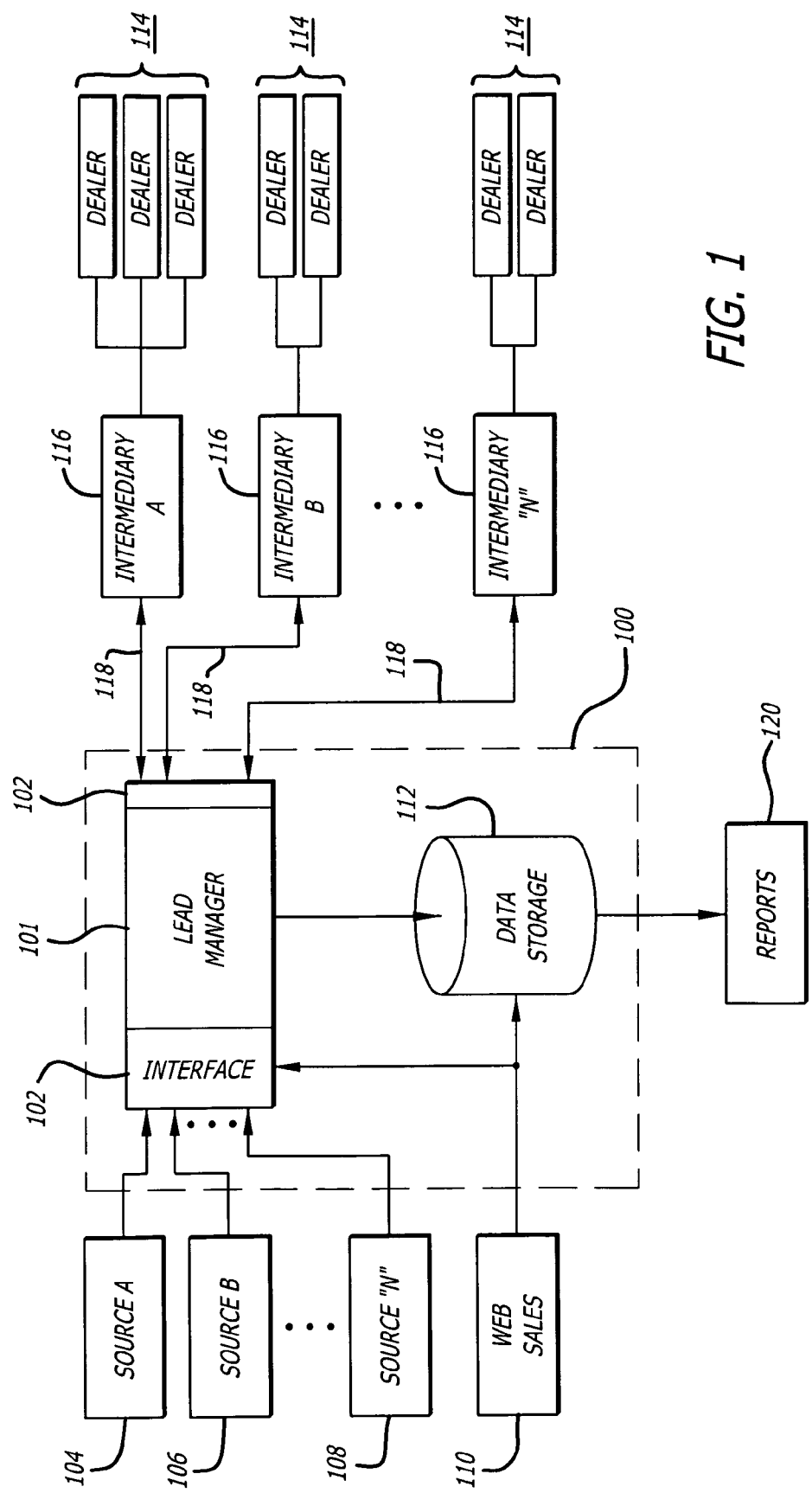
FIG. 1 is a block diagram illustrating functional components of an exemplary lead management system.

FIG. 1 is a block diagram illustrating functional components of an exemplary lead management system. A lead reception center 100, which may be a central system that receives leads from a plurality of sources, comprises a lead manager component 101, an interface 102, and memory which may include an associated database 112 for data storage. The lead manager component 100 of an exemplary lead management system comprises hardware and software components. A processor is configured to analyze data relating to incoming leads for purposes of managing proper distribution and conducting lead throughput analysis. Lead throughput analysis refers to the ability to track the utility of a distributed lead and calculate success metrics reporting on sales or business that were generated as a result of a dealer following up on the lead. Software is configured to receive a plurality of incoming leads from multiple sources, match and distribute the leads to multiple dealers, receive lead throughput information from the dealers, and analyze success metrics from the lead throughput data.

Lead throughput information refers to information about actions taken by a dealer in response to receiving a lead, as well as to the generation and extent of business or profits realized from those actions. "Lead throughput information" includes but is not limited to information that may indicate whether a received lead has been acted upon, whether it resulted in a sale to the customer, and the level or degree of effort or work that a dealer engaged in to follow up on the lead. The data may include, but is not limited to, a unique identification code assigned by the lead management system upon receipt, an even stamp to indicate a date and time of receipt and distribution of the lead, a flag to indicate whether an automatic response was sent to the customer upon receipt of the lead by the dealer, a second event stamp to indicate when the lead was acted upon by the dealer, and information regarding the type of communication that was used to generate the lead. The term "success metrics" as used herein refers to measurements related to properties regarding the dealer's follow-up and success with a received lead. Quantities included in success metrics may include but are not limited to a lead response time measurement, a status indicator, future action indicator, assigned consultant identification, and final lead disposition. Lead response time equals the amount of time that lapsed between dealer receipt and dealer action upon a lead. A status indicator may be a value indicating the current status of the lead, which may be, for example, new, in process, pending approval, or at other stages in the lead follow-up process. A future action indicator may be a value that indicates which dealer actions are scheduled or should be taken to follow up on a received lead. An assigned consultant identification may be a value indicating which of a dealer's sales consultant has been assigned to follow-up on the lead. Final lead disposition may be a value or description indicating the final outcome of exhausted follow-up efforts on a lead. Of course, other information relating to the success of lead throughput may be analyzed for the purpose of calculating different types of success metrics, and the particular examples of success metrics enumerated herein are described for exemplary rather than limiting purposes.

Lead Manager 100 includes an interface 102 comprising hardware and software for conveying data communications between external lead source systems and the lead management system. The interface receives leads from various lead providers 104, 106, 108, and routes them to lead manager 100. Lead providers 104, 106 and 108 may include original equipment manufacturers (OEMs), dealership websites 110, manufacturer websites, vehicle appraisal websites and services, and other third party sources. Leads may be transmitted via MIME (e-mails) in XML format, or may take various other forms to facilitate transmission and subsequent processing in accordance with the exemplary lead management system. Appropriate formats will be discussed in further detail below. Lead manager 100 collects the data that are passed through the interface and stores them in a database 112 or other data repository. Dealership websites 110 may pass lead data through interface 102 or directly to database 112. In order to facilitate effective exchange of data, all interfacing applications, whether internal or external may use a universal data format. The universal data format may be any standard data format such as, for example, Auto-lead Data Format (ADF)1.0 or higher XML. Five categories of information are supported by ADF 1.0 include lead information, vehicle information, customer information, intermediary information and service provider information. Moreover, each category may include several tags for sub-categories of information. For example, vehicle information may include tags for year, make and model. Customer information may include tags for name and contact information. Other categories of sub-information will be recognized and established by those skilled in the art for supporting the functions of an exemplary lead management system. Interfacing applications to the lead manager may also subscribe to standard or pre-defined schedules pertaining to frequency of data transfer/synchronization, and follow well-known data transfer standards pertaining to reconciliation and quality control functions. Of course, other data formats are possible, and the universal data format selected to be supported by the exemplary lead management system need not be ADF 1.0.

The exemplary lead management system, after receiving leads at lead manager 100, then operates to distribute those leads to appropriate dealers 114. Matching a lead to an appropriate dealer 114 may depend on geographic location, prior relationship, dealer need, or other determining factors. For example, if a lead refers to a potential customer who resides in a certain geographic area of the United States, lead manager 100 may limit the selection of dealers to whom that lead might be forwarded to those within a certain proximity of that geographic location. Also, if a customer has already established a relationship with a particular dealer, historical data about which may be stored in database 112, a lead regarding that customer may be forwarded to that particular dealer in order to build on the pre-existing relationship. Dealers may also be monitored to determine the number of leads they receive and, in rotating fashion, be assigned a relatively uniform number of leads. Hence, lead manager 100 may operate to distribute a lead to a dealer, within a set of appropriate dealers, who has received the fewest leads in recent history. Alternatively, dealers with historical data of successful lead throughput may be awarded with greater distribution of future leads, for business efficiency purposes. Of course, other variations, methods, and criteria for dealer selection are possible and will be recognized by those skilled in the art.

Once a dealer is selected as an intended recipient of an incoming lead, the type of lead management software operated by that dealer is identified. This may be done, for example, by identifying the particular brand or version of software that the dealer is running. Dealers may register with lead manager 100 to indicate the brand or type of software that they operate, so that the lead management system may be prepared to interface with that software. Database 112 may store the registration information, so that lead manager 100 may associate a software type with a particular dealer upon a simple query. After the particular brand or type of dealer software is identified, lead manager 100 identifies an intermediary 116 for that software type. An intermediary may be, but is not necessarily, the entity that manufactured the identified software type. Intermediaries may also include service providers who support the identified software type, or other third parties capable of interfacing with the dealer's software. As shown in FIG. 1, a single intermediary 116 can service lead management software for multiple dealers 114.

After identifying an intermediary, lead manager 100 forwards a received lead to the identified intermediary 116, along with instructions regarding which dealer the intermediary should deliver the lead to. The instructions may be, for example, a unique identifier assigned to the dealer, which indicates to the intermediary the identity of the dealer to whom the lead is to be forwarded. The intermediary, in accordance with these instructions, whatever form the instructions may comprise, forwards the lead to the identified dealer, who can then utilize the lead to generate business and initiate a sale. Leads may be transmitted between lead manager 100 and intermediary 116 via an e-mail in an ASCII format, Web Service, HTTP POST, or may conform to another data format selected for ease of transmission and subsequent data access and processing. These formats are explained in further detail below. Other appropriate universal data formats for lead data will be recognized by those skilled in the art, and should be selected to conform with requirements of both lead manager 100 and data receiving functions of the dealers' lead management software applications. Also, the lead data may be formatted so as to be content rich. For example, incoming leads from external sources may be content rich, providing detailed information about a potential buyer beyond basic name and address information, extending to details regarding whether the customer is pre-approved for loans, additional accessories the customer is interested in, and the like. By selecting an appropriate transmission format, the detailed information may be preserved, such that the content rich lead is forwarded to the dealer without a significant loss of useful information.

As described above, an appropriate transmission format from the lead manager to an intermediary may comprise, for example, an ADF-compliant XML structure. As explained above, the ADF format is an open XML-based standard for the interchange of lead information via e-mail. Several data fields may be established and populated upon arrival of an incoming lead, to prepare the lead for distribution to a dealer. For example, a "From:" field may contain an e-mail address for a registered lead source. The email address may be registered with the lead manager component and marked within the exemplary lead management system as an active lead provider. A "To:" field may include an e-mail address associated with the lead manager component of the lead management system. A "Subject:" filed may contain the actual lead data, in an ADF XML plain text format. An example of a lead structured according to the exemplary ADF structure is illustrated below:

```
To: anewlead@MyLeadManager.com
From: externalsource@leadprovider.com
Subject:
    <?xml version="1.0" encoding = "utf-8"?>
    <soap:Envelope xmlns:xsi="http://www.w3.org/2001/XMLSchema-
    instance" xmlns:xsd="http://www.w3.org/2001/XMLSchema"
    xmlns:soap="http://schemas.xmlsoap.org/soap/envelope/">
        <soap:Body>
            <NewLead smlns="http://tempura.org/">
                <leadProviderID>string</leadProviderID>
                <leadID>string</leadID>
                <retURL>string</retURL>
                <adfData>string</adfData>
            </NewLead>
        </soap:Body>
    </soap:Envelope>
```

In the above example, various fields are established for the provision of specific types of information contained within the lead. For example, the "leadProviderID" field may include a unique identifier provided for each registered external lead source by the lead manager component of the exemplary lead management system. The "leadID" field may include a unique identifier submitted by an external lead source to the lead manager. This lead identifier may be used to identify the lead when lead throughput data is returned from a dealer to the lead manger. The "retURL" field may include an e-mail address that may be used to return lead throughput data to the lead manager. The "adfData" field may include ADF formatted lead information that is submitted to the lead manager with an incoming lead to be processed and forwarded to an appropriate dealer.

Another exemplary data format comprises secure HTTPS (Web Services) compatible format. An illustration of this format appears below:

```
POST /SampleService1/Service1.asmx HTTP/1.1
Host: localhost
Content-Type: text/xml; charset=utf-8
Content-Length: length
SOAPAction: "https://tempura.org/NewLead"
<xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
```

```
    <soap:Body>
        <NewLead xmlns="http://tempura.org/">
            <leadProviderID?string</leadProviderID?
            <leadID>string</leadID>
            <adfData>string</adfData>
        </NewLead>
    </soap:Body>
</soap:Envelope>
```

In the above example, various fields are established for the provision of specific types of information contained within the lead. For example, the "leadProviderID" field may include a unique identifier provided for each registered external lead source by the lead manager component of the exemplary lead management system. The "leadID" field may include a unique identifier submitted by an external lead source to the lead manager. This lead identifier may be used to identify the lead when lead throughput data is returned from a dealer to the lead manger. The "adfData" field may include ADF formatted lead information that is submitted to the lead manager with an incoming lead to be processed and forwarded to an appropriate dealer.

A third exemplary data format comprises HTTP POST format. An illustration of this format appears below:

```
POST /SampleService1/Service1.asmx/NewLead HTTP/1.1
Host: localhost
Content-Type: application/x-www-form-urlencoded
Content-Length: length
leadProviderID=string&leadID=string&adfData=string
```

In the above example, various fields are established for the provision of specific types of information contained within the lead. For example, the "leadProviderID" field may include a unique identifier provided for each registered external lead source by the lead manager component of the exemplary lead management system. The "leadID" field may include a unique identifier submitted by an external lead source to the lead manager. This lead identifier may be used to identify the lead when lead throughput data is returned from a dealer to the lead manger. The "adfData" field may include ADF formatted lead information that is submitted to the lead manager with an incoming lead to be processed and forwarded to an appropriate dealer.

Of course, it is to be understood that various other data formats be selected as the universal data format utilized for transmission of lead data from the lead manager to intermediaries. Upon receipt by an intermediary, the intermediary may convert the lead data from the universal data format to dealer-compatible format that is used by the identified dealer's software. Dealer-compatible data formats may also comprise one or more of the data formats described above, or may comprise other standard or proprietary data formats.

Continuing now with the description of FIG. 1, the exemplary lead management system may be bidirectional in that it receives data back from the destinations it sends data to. This is indicated by the bi-directional lines 118 between intermediaries 116 and lead manager 100. Data received by lead manager 100 from an intermediary 116 comprise lead throughput information, and may include but are not limited to event time stamps such as arrival and response times, status state indicators, status change indicators, and the like, from various dealer-operated lead management software applications. In this reverse direction, the intermediary converts lead throughput data from the dealer-compatible format conveyed by the dealer's software to the universal format employed by the lead manager. The converted lead throughput information may then be transmitted to lead manager 100 using an HTTP POST, or by a direct call to a web service supported by lead manager 100, using SOAP/XML. Appropriate URLs for these transmissions may be provided to an intermediary after the intermediary completes a certification and/or registration process with the exemplary lead management system. These returned lead throughput data may then be used for a variety of purposes, including but not limited to analysis and generation of success metrics. Success metrics may be embodied as reports 120, generated by the lead management system for purposes of business review and analysis.

Figure 2:
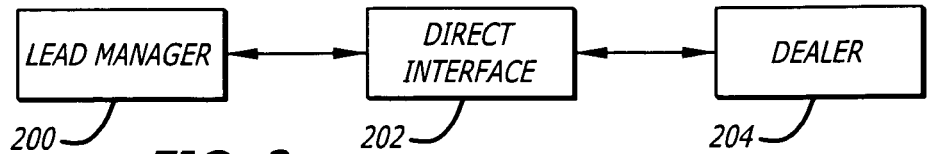
FIG. 2 is a block diagram illustrating functional components of an alternate exemplary lead management system.

FIG. 2 is a block diagram illustrating alternative functional components of an exemplary lead management system. Instead of communicating through an intermediary, lead manager 200 may be in more direct communication with a dealer 204 via a direct interface 202. Direct interface 202 may be a web-based interface, through which dealers may directly access the lead manager component to review incoming leads. Dealers may have the ability to create a template within lead manager 200. If a dealer, through direct interface 202, identifies an appealing lead, the dealer may place a direct request with lead manager 200 for receipt of that lead.

Figure 3:
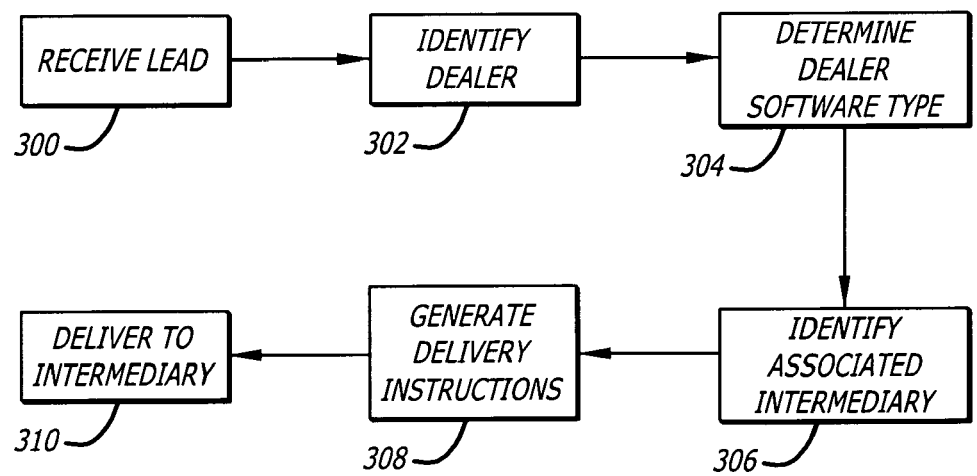
FIG. 3 is a flow chart illustrating functional features of a process performed by an exemplary lead management system.

FIG. 3 is a flow chart illustrating functional features of a process performed by an exemplary lead management system. At block 300, the lead management system receives a lead. The lead may come as a direct result of marketing efforts made by the company operating the lead management system, or may come from an external, third party source. Information included in the lead, including customer identification, is analyzed at block 302 for the purpose of determining the most appropriate dealer to handle the lead. As explained above, a variety of criteria may be used to determine which dealer a lead should be forwarded to. After a target dealer is identified, the lead management system determines at block 304 which type of lead management software the identified dealer utilizes in its business. Then, at block 306, the software identifies an intermediary that is associated with the dealer's lead management software. Instructions are generated at block 308, including information regarding which dealer the intermediary should deliver the lead to. The instructions may, for example, comprise a unique dealer identifier that is stored within the lead management system. The lead and the instructions are then delivered to the intermediary at block 310, whereupon the intermediary forwards the lead to the identified dealer pursuant to the instructions. As described above, lead data formats for transmission may comprise XML (ADF) utilizing Web services and HTTP transport, ASCII/ XML (ADF) with MIME (e-mail) transport, or other formats supported by the lead management system including external lead sources and dealer lead management software applications.

Figure 4:
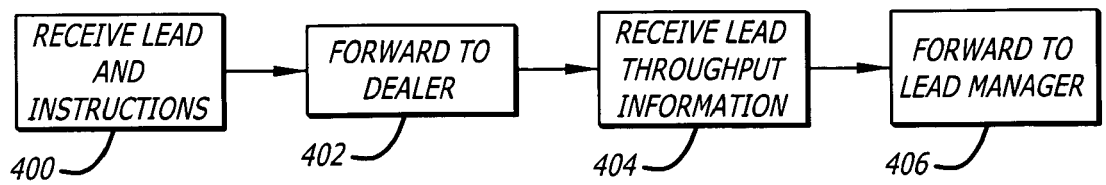
FIG. 4 is a flow chart illustrating a process that may be performed by a lead management software dealer in accordance with an exemplary lead management system.

FIG. 4 is a flow chart illustrating a process that may be performed by a lead management software dealer in accordance with an exemplary lead management system as described above. At block 400, the intermediary receives a lead and accompanying instructions from the lead manager component of the exemplary lead management system. At block 402 the intermediary, in accordance with the instructions, forwards the lead to a dealer identified in the instructions. After the dealer receives the lead, and as the dealer engages in follow-up activity regarding the received lead, the intermediary receives lead throughput information from the dealer, as indicated at block 404. This information may arrive from the dealer at various times after the delivery of a lead. For example, a dealer may send periodic updates to an intermediary regarding the dealer's progress in tracking and utilizing the lead to generate business and sales. At block 406, the intermediary forwards the lead throughput information to the lead manager component of the exemplary lead management system. At this point, the lead manager may perform lead throughput analysis and generate success metrics for use in further business analyses. This is described in further detail below, with reference to FIG. 5.

Figure 5:
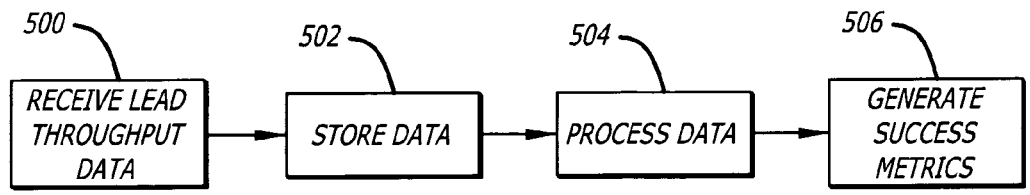
FIG. 5 is a flow chart illustrating additional functional features of a process performed by the exemplary lead management system.

FIG. 5 is a flow chart illustrating additional functional features of a process performed by the exemplary lead management system. At block 500, after a dealer has received a lead, the lead manager component of an exemplary lead management system receives lead throughput data. The data may come directly from the dealer, or via an intermediary or other intermediary for interfacing purposes. As described above, lead throughput data may be transmitted from dealer to lead manager periodically, and at multiple times during the existence and follow-up of a lead. In an exemplary embodiment, lead throughput data may be transmitted daily, to provide the lead manager with consistent daily updates regarding each dealer's timeliness, accuracy and method of follow-up on the leads it has received. The periodic transmissions may be part of a batch run that is initiated by either the lead manager or by the intermediary's or dealer's own lead management software. At block 502, the lead throughput data are stored, such as in database 112 in FIG. 1. At block 504, the lead throughput data may be accessed and analyzed to determine various properties regarding the dealer's follow-up and success with the lead. Hence, success metrics indicative of these and other properties of lead throughput are generated at block 506. A company operating the lead management system may thus validate the success of its leads and make future business decisions based on that measure of success.

Figure 6:
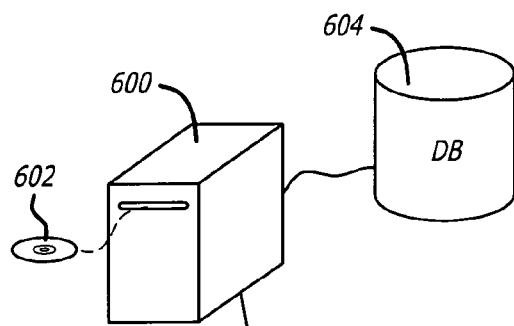
FIG. 6 illustrates various components of an exemplary lead management system and environment.
Figure 6:
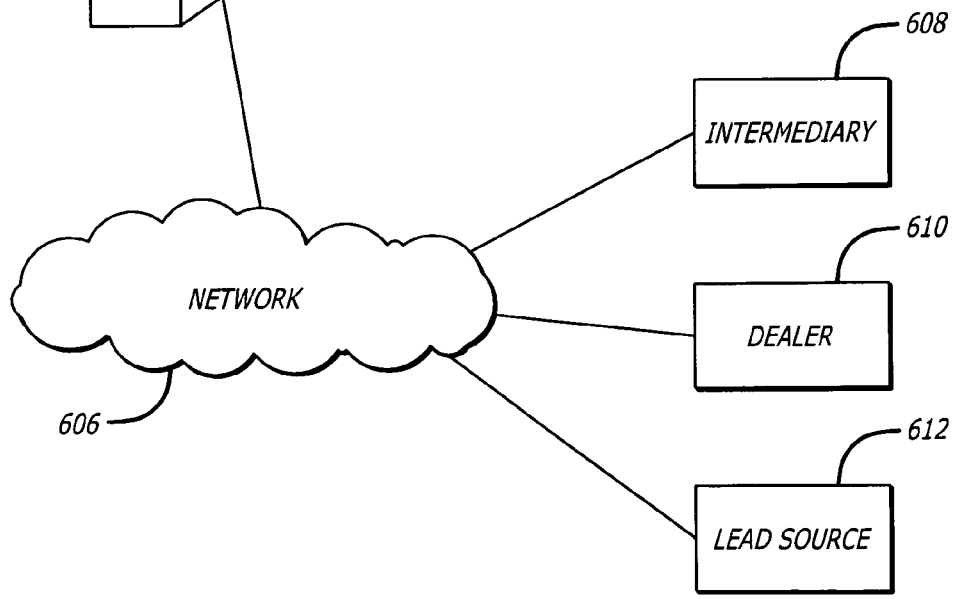

FIG. 6 illustrates various components of an exemplary lead management system and environment. A lead manager component and interface may be embodied within a computer 600, or a separate piece of hardware connectable thereto. Algorithms and other software may be embodied in computer readable media 602, such as a CDRom, flash memory, ROM within computer 600, or other well-known memory devices. A database 604 for storing incoming leads, received lead throughput data, and other lead management information may comprise any well-known database software or implementation. Network 606, such as the Internet or other communications network, may be a platform for communication and data transfer between computer 600 and each of intermediary 608, dealer 610 and lead source 612, where leads are originated. As described above, intermediary 608 and dealer 610 may also be in direct communication with one another. Of course, it is also understood that computer 600 may be in communication with a plurality of lead sources, and a plurality of dealers and intermediaries.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the disclosures herein. Thus, the present invention is not intended to be limited to the embodiments shown herein but is to be accorded the widest scope consistent with the principles and novel features disclosed herein.

We claim:

1. A computer-implemented method of distributing a plurality of incoming leads to a plurality of automotive dealers, each dealer utilizing one of several different types of lead management software, the method comprising:

receiving the incoming leads;

for a first of the received leads:
- a computer identifying a first dealer, from the plurality of dealers, to whom delivery of the lead would be appropriate based on the lead and information about the plurality of automotive dealers;
- a computer identifying a first type of lead management software which is being used by the first dealer by consulting a database of lead management software information;
- a computer identifying a first intermediary that is supporting the first type of lead management software and that is situated to interface with the lead management software being used by the first dealer; and
- delivering the first lead, together with information identifying the first dealer, to the first intermediary; and for a second of the received leads:
- a computer identifying a second dealer from the plurality of dealers that is different from the first, to whom delivery of the lead would be appropriate based on the lead and information about the plurality of automotive dealers;
- a computer identifying a second type of lead management software different from the first which is being used by the second dealer by consulting a database of lead management software information;
- a computer identifying a second intermediary different from the first that is supporting the second type of lead management software and that is situated to interface with the lead management software being used by the second dealer; and
- delivering the second lead, together with information identifying the second dealer, to the second intermediary.

2. The method of claim 1 further comprising the first intermediary forwarding the lead to the first dealer and the second intermediary forwarding the lead to the second dealer.

3. The method of claim 2 wherein the first intermediary converts the lead from a data format that is incompatible with the first type of lead management software to a data format that is compatible with the first type of lead management software before forwarding the lead to the first dealer and wherein the second intermediary converts the lead from a data format that is incompatible with the second type of lead management software and different from the format of the first lead to a data format that is compatible with the second type of lead management software before forwarding the lead to the second dealer.

4. The method of claim 1 wherein each of the received leads comes from one of a plurality of lead sources.

5. The method of claim 1 wherein the first intermediary comprises a vendor of the first lead management software and the second intermediary comprises a vendor of the second lead management software.

6. The method of claim 1 wherein the first intermediary comprises a service provider of the first lead management software and the second intermediary comprises a service provider of the second lead management software.

7. The method of claim 1 wherein the leads comprise sales leads.

8. The method of claim 1 wherein the method is performed by an automobile distributor.

9. The method of distributing leads of claim 1 further comprising:

delivering the leads to the first and the second dealers from a central system;

receiving information from the first and the second dealers regarding follow-up efforts that each dealer has made in connection with the leads delivered to the dealer from the central system;

storing the received information in memory; and analyzing the stored information.

10. The method of claim 9 wherein the received information is stored in a database.

11. The method of claim 9 wherein the central system is managed by an automobile distributor.

12. The method of claim 9 wherein where the information from the first and the second dealers is received, respectively, through the first and the second intermediary.

13. The method of claim 9 wherein the received information includes data indicating whether the delivered lead resulted in a sale to a customer to whom the lead referred.

14. Computer-readable media embodying a program of instructions executable by a computer to perform a method of distributing a plurality of incoming leads to a plurality of automotive dealers, each dealer utilizing one of several different types of lead management software, wherein the method comprises:

for a first of the received leads:
- identifying a first dealer, from the plurality of dealers, to whom delivery of the lead would be appropriate based on the lead and information about the plurality of automotive dealers;
- identifying a first type of lead management software which is being used by the first dealer by consulting a database of lead management software information;
- identifying a first intermediary that is supporting the first type of lead management software and that is situated to interface with the lead management software being used by the first dealer; and
- delivering the first lead, together with information identifying the first dealer, to the first intermediary; and for a second of the received leads:
- identifying a second dealer from the plurality of dealers that is different from the first, to whom delivery of the lead would be appropriate based on the lead and information about the plurality of automotive dealers;
- identifying a second type of lead management software different from the first which is being used by the second dealer by consulting a database of lead management software information;
- identifying a second intermediary different from the first that is supporting the second type of lead management software and that is situated to interface with the lead management software being used by the second dealer; and
- delivering the second lead, together with information identifying the second dealer, to the second intermediary.

15. The computer-readable media of claim 14, wherein the method further comprises the first intermediary forwarding the lead to the first dealer and the second intermediary forwarding the lead to the second dealer.

16. The computer-readable media of claim 14, wherein the method further comprises the first intermediary converts the lead from a data format that is incompatible with the first type of lead management software to a data format that is compatible with the first type of lead management software before forwarding the lead to the first dealer and wherein the second intermediary converts the lead from a data format that is incompatible with the second type of lead management software to a data format that is compatible with the second type of lead management software before forwarding the lead to the second dealer.

17. The computer-readable media of claim 14, wherein each of the received leads comes from one of a plurality of lead sources.

18. The computer-readable media of claim 14, wherein the first intermediary comprises a vendor of the first lead management software and the second intermediary comprises a vendor of the second lead management software.

19. The computer-readable media of claim 14, wherein the first intermediary comprises a service provider of the first lead management software and the second intermediary comprises a service provider of the second lead management software.

20. The computer-readable media of claim 14, wherein the leads comprise sales leads.

21. The computer-readable media of claim 14, wherein the method is performed by an automobile distributor.

22. The computer-readable media of claim 14 wherein the-method is further comprising:
   delivering the leads to the first and the second dealers from a central system;
   receiving information from the first and the second dealers regarding follow-up efforts that each dealer has made in connection with the leads delivered to the dealer from the central system;
   storing the received information in memory; and
   analyzing the stored information.

23. The computer-readable media of claim 22, wherein the memory comprises a database.

24. The computer-readable media of claim 22, wherein the central system is managed by an automobile distributor.

25. The computer-readable media of claim 22, wherein the information from the first and the second dealer is received, respectively, through the first and the second intermediary.

26. The computer-readable media of claim 22, wherein the received information comprises data indicating whether the delivered lead resulted in a sale to a customer to whom the lead referred.

27. A system for distributing a plurality of incoming leads to a plurality of automotive dealers, each dealer utilizing one of several different types of lead management software, the system comprising:
   a data interface configured to receive the leads; and
   a processor configured to, for a first of the received leads:
      identifying a first dealer, from the plurality of dealers, to whom delivery of the lead would be appropriate based on the lead and information about the plurality of automotive dealers;
      identifying a first type of lead management software which is being used by the first dealer by consulting a database of lead management software information;
      identifying a first intermediary that is supporting the first type of lead management software and that is situated to interface with the lead management software being used by the first dealer; and
      delivering the lead, together with information identifying the first dealer, to the first intermediary; and
   for a second of the received leads:
      identifying a second dealer from the plurality of dealers that is different from the first, to whom delivery of the lead would be appropriate based on the lead and information about the plurality of automotive dealers;
      identifying a second type of lead management software different from the first which is being used by the second dealer by consulting a database of lead management software information;
      identifying a second intermediary different from the first that is supporting the second type of lead management software and that is situated to interface with the lead management software being used by the second dealer; and
      delivering the second lead, together with information identifying the second dealer, to the second intermediary.

28. The system of claim 27 further comprising a second processor operated by first the intermediary and configured to forward the first lead to the first and a third processor operated by the second intermediary and configured to forward the second lead to the second dealer.

29. The system of claim 27 wherein the second processor is configured to convert the first lead from a data format that is incompatible with the first type of lead management software to a data format that is compatible with the first type of lead management software before forwarding the lead to the first dealer and the third processor is configured to convert the second lead from a data format that is incompatible with the second type of lead management software to a data format that is compatible with the first type of lead management software before forwarding the lead to the first dealer.

30. The system of claim 27 wherein each of the received leads comes from one of a plurality of lead sources.

31. The system of claim 27 wherein the first intermediary comprises a vendor of the first lead management software and the second intermediary comprises a vendor of the second lead management software.

32. The system of claim 27 wherein the first intermediary comprises a service provider of the first lead management software and the second intermediary comprises a service provider of the second lead management software.

33. The system of claim 27 wherein the leads comprise sales leads.

34. The system of claim 27 wherein the data interface and the processor are operated by an automobile distributor.

35. The A-system of claim 27 wherein:
   the processor is configured to cause the leads to be transmitted from a central system to the first and the second dealers;
   the data interface is configured to receive information from the first and the second dealers regarding follow-up efforts that each dealer has made in connection with the leads delivered to the dealer from the central system;
   the memory is configured to store the received information; and
   the processor is further configured to analyze the stored information.

36. The system of claim 35 wherein the memory comprises a database.

37. The system of claim 35 wherein the central system is managed by an automobile distributor.

38. The system of claim 35 further comprising a second and a third processor operated by the first and the second intermediary, respectively, and configured to forward the information from the first and the second dealer, respectively, to the central system.

39. The system of claim 35 wherein the received information comprises data indicating whether the delivered lead resulted in a sale to a customer to whom the lead referred.

40. A computer-implemented method of distributing a plurality of incoming sales leads that are in different formats to a plurality of automotive dealers, each dealer utilizing one of several different types of lead management software, the method comprising:

a computer receiving the incoming sales leads from a plurality of different lead sources;

for a first of the received sales leads:

a computer identifying a first dealer, from the plurality of dealers, to whom delivery of the sales lead would be appropriate based on the sales lead and information about the plurality of automotive dealers, including the locations of the dealers;

a computer identifying a first type of lead management software which is being used by the first dealer by consulting a database of lead management software information;

a computer identifying a first intermediary that is supporting the first type of lead management software and that is situated to interface with the lead management software being used by the first dealer; and delivering the first sales lead, together with information identifying the first dealer, to the first intermediary; and for a second of the received leads which is in a format different from the first of the received sales leads:

a computer identifying a second dealer from the plurality of dealers that is different from the first, to whom delivery of the sales lead would be appropriate based on the lead and information about the plurality of automotive dealers, including based on the locations of the dealers;

a computer identifying a second type of lead management software different from the first which is being used by the second dealer by consulting a database of lead management software information;

a computer identifying a second intermediary different from the first that is supporting the second type of lead management software and that is situated to interface with the lead management software being used by the second dealer; and delivering the second sales lead, together with information identifying the second dealer, to the second intermediary.

41. The computer-implemented method of claim 1 wherein the computer identifying the first dealer, the first type, and the first intermediary is the same computer.

42. The computer-implemented method of claim 40 wherein the computer identifying the first and the second dealers, the first and the second types, and the first and the second intermediaries is the same computer.

\* \* \* \* \*